Patented Dec. 27, 1938

2,142,076

UNITED STATES PATENT OFFICE 2,142,076

PHENOLIC ACETALDEHYDE RESIN AND PROCESS OF MAKING THE SAME

John B. Rust, Orange, N. J., assignor to Ellis-Foster Company, a corporation of New Jersey No Drawing. Application September 7, 1935, Serial No. 39,621. Renewed November 3, 1936

12 Claims. (Cl. 260—19)

This invention relates to improved phenolic-acetaldehyde resins and a process of making them, having as its primary aim the production of heat-bleached, light-colored condensation products which are soluble in drying oils and from which desirable light-colored varnishes may be made.

It is known that when a phenol is condensed with formaldehyde in aqueous solution in the presence of an acidic or basic catalyst, resins which are substantially lighter in color than WW rosin result if the original phenol is a pure, or a commercial straw-colored grade. It is also well-known that if acetaldehyde in aqueous solution is used to replace the formaldehyde and the condensation is carried out in the same manner, extremely dark-brown, soft resins are produced. The same results are known to occur when diluents other than water are employed. Gaseous acetaldehyde, either substantially pure or in admixture with inert gases, reacted with a phenol and mineral acid catalyst gives harder resins than those produced with diluted liquid acetaldehyde but the resins are substantially darker than WW rosin. It has been stated that light-colored resins may be made if an inert diluent such as carbon tetrachloride or trichloroethylene is employed and the reaction carried out at a low temperature in the presence of a large amount of strong mineral acid. The so-produced resins, however, are considerably darker than WW rosin and since the reaction of acetaldehyde with phenols is extremely slow at low temperatures, the length of time required for the process renders it commercially unpractical. The above statements are also known to apply to resins made with the various polymers of acetaldehyde. All of the processes which seek to produce light-colored resins call for long reaction at relatively low temperatures, i. e., below 90° C. or 100° C.

I have found, however, that light-colored resins may be made with a phenol and substantially non-aqueous acetaldehyde in the presence of a relatively weak (organic) acid at temperatures above 90° to 100° C. These temperatures are well above the lower temperatures formerly required, thus decreasing reaction time, allowing a rapid and easy method of preparing the resins.

Although the weak (organic) acids give somewhat lighter colored resins than do the mineral acids, I have found that oxalic-acid-catalyzed phenol-acetaldehyde resins are (after suitable heat-treatment) almost water-white and are colorless except for a slight amber tint. This result is unexpected and important, since ordinary pure, or commercial straw-colored phenols, which yield dark colored resins by other known processes give resins which (after a suitable heat-treatment) are almost water-white and substantially lighter than WW rosin. Furthermore the phenolic acetaldehyde resins catalyzed with oxalic acid are (after suitable heat-treatment) as light as, if not lighter, in color than the phenol-formaldehyde resins. The color of the final resins of the present invention does not represent merely a reduction in shade of color over the resins made by other known processes, but constitutes an extremely marked difference. For instance, a resin made with aqueous acetaldehyde, phenol and hydrochloric acid has the appearance of asphalt or coal since it is dark-brown or black. If this resin is placed alongside of a heat-treated phenol-acetaldehyde resin catalyzed with oxalic acid, the color difference may be said to be the difference between black and white.

The remarkable difference between the resins of this invention and other (older) resins made from a phenol and acetaldehyde is not only the lightness in color, but arises from the fact that when the resins are heated to remove water of condensation and to harden, they lighten in color or heat-bleach. This phenomenon is unexpected and is directly opposite from the effects noted when other phenol-aldehyde resins are heated. Moreover, there exists for each resinified phenol a critical temperature of lightening above which the resin must be heated in order to render it colorless. In general the temperature is above 180° C. and the majority of resins lighten between 180° and 200° C.

Since oxalic acid is a relatively weak acid, compared with hydrochloric or sulphuric acids, I prefer to use substantially non-aqueous acetaldehyde having a boiling range of 20° C. to 26° C. and whose purity is about 90% to 100%. When such pure acetaldehyde is employed, the reaction with a phenol progresses with rapidity at 90° C. Higher temperatures can be used with the result that the reaction is faster. Moreover, the color of the final resin is the same, being very much lighter than WW rosin. Gaseous as well as liquid acetaldehyde may be employed and as a gas it may be used in admixture with hydrocarbon gases in any concentration.

The extreme lightness in color of the resins made with oxalic acid and thereafter heat-bleached, makes them especially useful to varnish manufacturers, since varnishes and paints may be formulated which give light-colored, or water-white films allowing the use of delicately tinted pigments for decorative purposes. When cooked with drying oils they dissolve readily giving light-colored varnish solutions.

Phenol-formaldehyde resins give varnishes with drying oils which when air-dried in thin films take on a yellow coloration. The yellow color sometimes assumes the form of a bright fluorescent yellow and results from the air-drying of almost water-white films. When a resin made with phenol, or the usual phenol mixtures, aqueous acetaldehyde and strong acid catalyst is cooked with drying oils, varnishes are formed which upon drying in thin films discolor to a deep yellow or brown. However, in my copending application Serial No. 33,563 (now Patent 2,096,764) I have disclosed the exceptional fact that meta substituted phenols yield resins with aqueous acetaldehyde which have the property of giving substantially water-white non-yellowing varnishes with drying oils. Now I have found that the varnishes from the light-colored resins made with any phenol, substantially non-aqueous acetaldehyde and oxalic acid, heat-treated as described herein, also yield pale colored films which do not yellow as much as those of varnishes made with the same phenol, aqueous acetaldehyde, and strong acid (e. g. a mineral acid). This is an added advantage of the oxalic acid catalyzed resins and is remarkable insofar as a catalyst for a phenol-aldehyde resin does not usually affect the after yellowing of varnish films to such a great degree. For instance, if a varnish is formulated from a resin made with cresylic acid, aqueous acetaldehyde and hydrochloric acid, the film upon drying turns a dark brown color. If a similar varnish is made from a cresylic acid, non-aqueous acetaldehyde, oxalic acid resin, and heat-treated as described herein, the film upon drying remains very pale in color with scarcely no yellow, or brown coloration. Meta-substituted phenols resinified with substantially non-aqueous acetaldehyde in the presence of oxalic acid yield varnishes which are entirely non-yellowing.

Another important characteristic of the light-colored oxalic acid-catalyzed resins is their property of yielding varnish compositions which do not form skins upon standing for several months in closed containers. Those who use varnishes and paints find skinning very troublesome, since it necessitates straining of the paint with consequent loss of paint material. Various agents are generally employed to prevent skin formation such as dipentene, pine oil and volatile anti-oxidants. The varnishes and paints made with the resins of the present invention, however, do not require the addition of such agents since there is little or no tendency for skin formation. On the other hand, the varnishes are rapid drying, requiring from two to four hours to yield a film free from tackiness.

As well as being light in color the resins are hard, brittle and are obtained in good yield, varying from 105% to 127% based on the phenol, depending upon the degree to which the reaction has been allowed to proceed. The resins are all readily soluble in drying oils and the varnishes yield coatings of exceptional durability and resistance to water, acids, alkali, weathering, fumes and other film destroying agents.

It is understood, therefore, in this process that all darkening catalysts such as mineral acids, bases, basic salt, acid salts of polybasic mineral acids, and other organic agents which catalyze the phenol-acetaldehyde reaction but yield dark resins are excluded. In general, most acids have a darkening or blackening action and hence the resins of the present process are free from such agents of discoloration. Furthermore, the oxalic acid may be substantially eliminated from the reaction mass by washing the resin before heat-bleaching is undertaken. Any acid which remains in the resin after the heat-bleaching treatment may be neutralized by esterification with alcohols or it may be neutralized with lime, or alkali.

In making the phenol-acetaldehyde resins the proportion of oxalic acid may, of course, be varied at will, or for a specific type of resin. However, proportions up to 20% based on the phenol give resins of satisfactory hardness and solubility for use in varnishes. I do not limit myself to these amounts, and have made satisfactory resins when using 50% of oxalic acid. The amount of acetaldehyde also is not fixed, but from ½ mole to 1½ moles of acetaldehyde per mole of the phenol will yield satisfactory resins. Furthermore, the acetaldehyde may be condensed at ordinary pressures (i. e. at or about atmospheric pressure) or at somewhat elevated pressures. It is desirable to use an autoclave or other pressure apparatus when liquid acetaldehyde is employed. When gaseous acetaldehyde is used the gas or mixed gases may be bubbled through the hot mixture of the phenol and oxalic acid. The gas may be passed into the mixture rapidly in the form of minute bubbles, giving a large reacting surface and hence cutting down the reaction time.

An important function of the diluent hydrocarbon gas is the removal of water from the sphere of reaction as rapidly as it is formed, whereupon the unreacted portion of the gas may be dried to remove water and recirculated. The high temperatures used in this process also help to create or maintain an anhydrous reacting condition.

The following are examples given to illustrate the nature of the resins and the processes of making them. They should not be construed as limiting, but only as explanations of methods and properties described herein. All proportions are in parts by weight.

*Example 1.*—60 parts of a commercial 99% straw-colored cresylic acid, 50% of which distils below 207° C. and 95% below 220° C., are mixed with 6 parts of oxalic acid on a steam bath at 90° C. and acetaldehyde gas is bubbled through the mixture at a rate of flow equivalent to 10 parts of acetaldehyde per hour, for 4½ hours. The resin at ordinary temperatures is hard, brittle and somewhat dark in color and is washed with water to remove excess acid. It is then heated to about 200° C. to dehydrate, harden, and bleach. The final resin is hard, brittle and very pale yellow in color, lighter than WW grade of rosin, and has a softening point of about 91° C. and an acid number of 42.

*Example 2.*—53 parts of the cresylic acid used in Example 1, 5 parts of maleic acid and 30 parts of 95% liquid acetaldehyde are heated on a steam bath at 90° C. under a thoroughly cooled reflux condenser for 4 hours. The dark resin which forms is washed with water to remove the maleic acid, then is heated to 200° C. to dehydrate and harden. A hard, brittle resin results which is substantially darker than WW rosin

*Example 3.*—53 parts of the cresylic acid used in Example 1 are heated at 90° C. with 5 parts of oxalic acid and 30 parts of 95% liquid acetaldehyde under a thoroughly cooled reflux condenser for 4 hours. The dark resin is solid at room temperature and is washed in hot water which removes the excess of oxalic acid, then heated to 200°–210° C. to dehydrate, harden and bleach. The final resin is hard, brittle, has an acid number of 33, a softening point of about 88° C. and is pale yellow in color, about that of WW rosin.

*Example 4.*—60 parts of the cresylic acid used in Example 1 are mixed with 6 parts of maleic acid and heated on a steam bath at 90° C. Acetaldehyde gas is bubbled through the mixture at about the same rate as that in Example 1, for 4½ hours. The dark resin which forms is washed thoroughly with water, then is heated to 210° C. to dehydrate and harden. The resulting resin is hard, brittle, has an acid number of 60, a softening point of 97° C. and is darker than WW rosin.

*Example 5.*—60 parts of the cresylic acid used in Example 1 are heated with 6 parts of oxalic acid to 110°–120° C. and a 50% mixture of illuminating gas and acetaldehyde gas is passed through the mixture for 4 hours. The acetaldehyde gas results from the evaporation of 35 parts of liquid acetaldehyde of boiling range from 20° to 24° C. The dark resinous product which forms is washed thoroughly with water which will remove the excess of oxalic acid, then is heated to 210°–220° C. to dehydrate, harden and bleach. The final resin is hard, brittle and has a color approximately that of WW rosin.

*Example 6.*—60 parts of U. S. P. phenol are mixed with 6 parts of oxalic acid and heated on a steam bath at 95° C. for 6 hours while acetaldehyde gas is being passed through the mixture at about the same rate as that of Example 1. The dark resinous product is washed thoroughly with hot water, then heated to 210° C. to dehydrate, harden and bleach. The final resin is hard, brittle and has an acid number of 52. The color is almost water-white, having a pale yellow tint and is substantially lighter than WW rosin.

*Example 7.*—60 parts of straw-colored commercial mixed xylenols boiling between 210° C. and 230° C. are heated with 6 parts of oxalic acid to 115° to 130° C. and 45 parts acetaldehyde gas diluted to 50% strength is passed through the mixture for about 2 hours. The dark resinous product which forms is washed thoroughly with water, then heated to 215° C. to dehydrate, harden and bleach. The final resin is hard, brittle and has a color approximately that of WW rosin.

*Example 8.*—60 parts of symmetrical xylenol are heated with 6 parts of oxalic acid to 100°–110° C. and acetaldehyde gas in 50% admixture with inert gases passed through the melt for about 6 hours, the acetaldehyde gas resulting from the evaporation of 100 parts of 99% liquid acetaldehyde. The resinous product is washed with hot water, then heated to 210° C. to dehydrate and harden. The final resin is hard, brittle, has an acid number of 43 and is almost water-white in color.

*Example 9.*—700 parts of a commercial mixture of meta and para cresols are heated to 100–110° C. with 70 parts of oxalic acid and acetaldehyde gas is passed through the melt for 8 hours at a volume equivalent to 34 parts of acetaldehyde per hour. The dark resin which results is washed with 3000 parts of boiling water to remove the excess of oxalic acid then heated to 210°–220° C. to dehydrate, harden and bleach. The final resin is hard, brittle, has a softening point of 103° C. and an acid number of 67. It is very pale yellow in color, being substantially lighter than WW rosin.

*Example 10 (Formation of a dark colored resin).*—60 parts of a commercial mixture of meta and para cresols are mixed with 2 parts of a 35% aqueous hydrochloric acid solution and acetaldehyde gas passed through the mixture while it is being heated on a steam bath at 90° C. at a rate of flow about equal to that of Example 1 for 4 hours. The dark resin is hard and brittle and is boiled with water to remove acid, then heated to 210° C. to dehydrate and harden. The final resin has an acid number of 66, is hard, brittle and dark in color so that ordinary daylight cannot be seen through a one inch section.

This latter resin is in contrast to the resin of Example 9 which is so pale in color that ordinary light is transmitted easily through a one foot section.

*Example 11.*—60 parts of a commercial mixture of meta and para cresols are heated with 6 parts of oxalic acid at 90° C. on a steam bath and 45 parts of acetaldehyde gas are passed through the hot mixture over a period of 5 hours. The dark resinous product which forms is washed with water, then is heated to 210° C. to dehydrate, harden and bleach. The final resin is hard, brittle, has an acid number of 79 and a softening point of 103° C. It is pale in color, being substantially lighter than WW rosin.

*Example 12.*—60 parts of a commercial mixture of meta and para cresols are heated with 3 parts of oxalic acid to 110° C. and a 50% mixture of acetaldehyde gas and illuminating gas passed through the mixture for 6 hours, the acetaldehyde gas resulting from 29 parts of 99% liquid acetaldehyde. The dark resin which forms is washed thoroughly with hot water to remove excess acid, then is heated to 210°–220° C. to dehydrate, harden and bleach. The resulting resin is hard, brittle and substantially lighter in color than WW rosin. The yield is about 80% based on the cresols.

*Example 13.*—60 parts of a commercial mixture of meta and para cresols are heated with 30 parts of oxalic acid to 105°–115° C. and acetaldehyde gas resulting from 45 parts of 99% liquid acetaldehyde in 50% admixture with illuminating gas is passed through the mixture for 1½ hours. The resulting dark product is washed thoroughly with water, then heated to 210°–220° C. to dehydrate, harden and bleach. The final resin is hard, brittle and substantially lighter in color than WW rosin. The yield is about 115% based on the cresols. The water used to wash the resin is collected and evaporated, yielding 30 parts of oxalic acid when dry. This showed that the washing removed all of the oxalic acid added.

In connection with the last two examples, it will be noted that the resin of Example 12 is obtained in rather poor yield indicating that with 5% oxalic acid the acetaldehyde should be absorbed for a longer time than when using 10% oxalic acid. Example 13 uses 50% oxalic acid and the absorption of acetaldehyde is extremely rapid, requiring only a quarter of the reaction time that Example 12 uses and producing a harder resin in greater yield.

Acetaldehyde will react with phenols in the gaseous form very readily, but when diluted with hydrocarbon gases will react to even better advantage, since a more complete control of the reaction is effected in this manner. Furthermore, when diluted the gases which do not enter into reaction with the phenol serve to remove the water, liberated during the condensation from the sphere of reaction, thus insuring a more anhydrous condition, giving rise to a more rapid reaction and better control. The reaction of acetaldehyde gas also will take place with phenol in the presence of the relatively weak acid, oxalic acid. The phenol is present in very large excess through the first part of the reaction, thus further insuring a better control.

The resins of the foregoing examples, with the exception of that of Example 10, give relatively light-colored varnishes. Those made with oxalic acid (i. e. all except Examples 2, 4 and 10) yield extremely light-colored varnishes which dry to hard, glossy coatings which are pale in color, as will be described below. The color of the varnish solutions is measured by comparison with a set of standards proposed by Henry A. Gardner in Physical and Chemical Examination of Paints, Varnishes, Lacquers, and Colors, 4th edition, October 1927, Table 61, page 480. The color standards serve also for color determination of resins. The resins are first dissolved in an equal weight of solvent and the color of the solutions compared. For instance, 5 parts of the resin of Example 9 are dissolved in 3 parts of benzol and 2 parts of alcohol, giving a solution having a color of #4 Gardner scale. In contrast to this resin, a similar solution of WW rosin has a color of #6 Gardner scale and a 50% solution of a representative resin made with the same phenol as in Example 9, 35% aqueous acetaldehyde and hydrochloric acid condensing agent, has a color between #9 and #10 Gardner scale. The comparators having a color of #9, #10, #11 and #12 on this scale represent very dark solutions, #6 is a light medium-brown shade, while #2, #3 and #4 are substantially water-white.

*Example 14.*—10 parts of the resin of Example 3 are mixed with 17 parts of tung oil and 3 parts of linseed oil bodied by heating raw linseed oil between 300° and 330° C. for 2½ hours and hereafter referred to in the examples merely as bodied linseed oil. The mixture is heated to 270° C. and held at this temperature for 8 minutes. It is cooled to 250° C. and held at the latter temperature for about 20 minutes. It is then thinned with 30 parts of V. M. and P. naphtha. The varnish solution has a color of #5 Gardner scale and has the correct brushing consistency. 0.9 part of a 33⅓% solution of a mixed lead and cobalt naphthenate drier solution in V. M. and P. naphtha (hereafter referred to in the examples as drier solution) is added. A film of the varnish dries free from tackiness in 4 hours and remains pale in color.

*Example 15.*—10 parts of the resin of Example 11 are mixed with 17 parts of tung oil and 3 parts of bodied linseed oil. The mixture is heated at 270° C. for 8 minutes, then at 250° C. for 15 minutes. It is thinned with a mixture of 27 parts V. M. and P. naphtha and 3 parts of xylol. The varnish solution has a color of #6 Gardner scale. When 0.9 part of drier solution is added, a film dries hard and almost colorless in 4 hours.

*Example 16.*—21.5 parts of the resin of Example 11 are mixed with 30 parts of tung oil and 6.3 parts of bodied linseed oil. The mixture is heated at 270° C. for 27 minutes, then 5.7 parts of tung oil are added and cooled to 200° C. The varnish base is held at the latter temperature for a few minutes, then thinned with 63 parts of V. M. and P. naphtha. The varnish is ground with 63 parts of lithopone pigment in a paint mill until a smooth homogeneous paint results, then 1.9 parts of drier solution are added. The paint dries hard, glossy and free from tackiness in 4 hours and upon drying is the same white color as the lithopone pigment.

*Example 17.*—20 parts of the resin of Example 8 are mixed with 34 parts of tung oil and 6 parts of bodied linseed oil. The mixture is heated at 270° C. for 20 minutes, then at 250° C. for 15 minutes. The varnish base is thinned with 60 parts of V. M. and P. naphtha, giving a varnish solution with a color of #6 Gardner scale. 1.8 parts of drier solution are added and a film from the resulting varnish dries tack-free in 4 hours and remains water-white in color. Upon exposure or weathering the film does not change in color.

*Example 18.*—60 parts of the resin of Example 9 are mixed with 110 parts of tung oil and 10 parts of bodied linseed oil. The mixture is heated at 270° C. for 8 minutes, then at 250° C. for 10 minutes. The base is then thinned with 180 parts of V. M. and P. naphtha and 5.4 parts of drier solution added. A film of the varnish dries tack-free in 3½ hours and remains very light in color. A brushing enamel is made from the above varnish by grinding it in a pebble mill with 180 parts of titanium dioxide pigment. The paint dries tack-free in about 3½ hours and remains a glossy white upon drying.

*Example 19.*—20 parts of the resin from Example 1 are mixed with 34 parts of tung oil and 6 parts of bodied linseed oil. The mixture is heated at 270° C. for 13 minutes, then at 250° C. for another 13 minutes. The varnish base is thinned with 60 parts of V. M. and P. naphtha, giving a solution having a color of #6 Gardner scale. 1.8 parts of drier solution are added, giving a varnish a film of which dries within 4 hours to a tack-free condition and upon becoming hard remains pale in color, almost water-white.

*Example 20.*—20 parts of the resin of Example 4 are mixed with 34 parts of tung oil and 6 parts of bodied linseed oil. The mixture is heated at 270° C. for 10 minutes, then at 250° C. for 16 minutes. The base is thinned with 60 parts of V. M. and P. naphtha, yielding a solution having a color of #9 Gardner scale. 1.8 parts of drier solution are added and a film of the varnish is poured on a glass plate to facilitate observation. The film dries tack-free within 5 hours and upon becoming hard takes on a brown coloration.

The resins of the present invention besides being readily soluble in drying and semi-drying oils are soluble in other vegetable oils which are non-drying. When cooked with drying oils they dissolve readily and if the cooking is carried out long enough combine with the oils to form a petroleum-spirit soluble material. For this reason the heating should be carried out at a relatively high temperature, for instance 270° C., and for a length of time sufficient to body the varnish base but not to cause gel formation. The varnish compositions may be used with diluents such as V. M. and P. naphtha, xylol, and so forth, as varnishes and they may be mixed with pigments and dyes to serve as paints and enamels. Without diluents they may be rolled onto, or pressed into fabric for making oiled and waterproof cloth. The compositions can be used with or without driers and if used without drying agents may be hardened by baking at 50° C. to 200° C.

The resins, besides being used in varnishes, may be incorporated with fillers and a hardening agent such as paraformaldehyde or hexamethylenetetramine and molded under heat and pressure until cured. Their lightness in color also makes them useful in solution as lacquers to which plasticizers may be added to render the film flexible. The resins may be dissolved in acetone, methyl ethyl ketone, cyclohexane, benzene, xylene or mixtures of these solvents with ethyl alcohol, butyl acetate, ethyl lactate, glycol monoethyl ether, and so forth. In such solvents they may be mixed with nitrocellulose and used in composite lacquers with dyes or pigments, if desired. The resins are completely miscible with nitrocellulose in solution and may be used as a lacquer resin in this form and plasticizers added to give the film the requisite flexibility.

The use of a diluent gas with acetaldehyde is desirable because of the resulting better control of the resinification and the desirable orientation of the reaction which appears to result. I prefer a hydrocarbon gas mixture containing, for example, methane, ethylene and so forth. Thus I may use illuminating gas, natural gas, and similar gaseous diluents. The proportion of these may be varied with respect to the gaseous acetaldehyde, for example, 10% of the aldehyde to 90% of the hydrocarbon diluent to, say, 50% of the aldehyde, or even higher. For the production of light-stable varnishes I prefer a concentration of 10% to 20% of acetaldehyde in producing a resin especially suitable for the purpose.

The remarkable distinguishing feature which serves to differentiate the resin from other phenol-acetaldehyde resins is the heat-bleaching action referred to above. When the resins are first made before dehydration, they are relatively very dark in color, being substantially darker than WW rosin, 50% solutions having a color of about #8 to #10 Gardner scale. However, when heated to dehydrate a critical temperature is reached and the resins begin to lighten perceptibly. As heating is continued above this critical temperature the resins lighten rapidly until they reach a maximum of color lightness, 50% solutions having a color of about #3 to #5 Gardner scale. This critical temperature is different for different phenols or phenol mixtures, but lies within the range of 180° C. to 250° C. The majority of the resins begin to lighten at 190° to 200° C. However, if a resin made with a phenol, or phenol mixture, acetaldehyde and an acid condensing agent other than oxalic acid is heated between the range of temperatures of 180° to 250° C. to dehydrate, no lightening in color takes place, but the resins remain the same color, or become darker. In the case of mineral acid condensing agents, the color becomes darker, with other agents, oxalic acid excepted, the color remains approximately the same. Furthermore, the color lightening in the case of oxalic acid is not merely a change in shade of color, but may be described as a change from black to white. The resin at first is extremely dark, being an opaque reddish-brown, but at the end of heating it is white with a slight amber tint. The color change is not as great with some phenols as with others, but the degree of change is extreme in all cases.

The preferred process is, therefore, to pass acetaldehyde gas in admixture with hydrocarbon gases, some components of which may be unsaturated, through a hot mixture of a phenol containing oxalic acid until a resin is formed, then heating said resin to above the critical temperature of lightening, say, between 180° C. and 200° C. The dilute-acetaldehyde-gassed-phenolic so prepared will be very light in color, hard, brittle, have a softening point between 80° and 110° C. or higher and be readily soluble in drying oils. The drying oil varnishes will have the property of great durability, lightness in color and will be characterized by their drying to light colored films.

Although carbolic acid-acetaldehyde resin is insoluble or very slightly soluble in drying oils, it may be dissolved in glycol monoethyl ether known to the trade as "Cellosolve" or mixtures of this solvent and xylol, toluol or solvent naphtha and the like, and used as a lacquer. When such solutions are applied to a surface and baked in an oven at, say, 160° to 170° C., they form a hard, brittle, infusible coating. The mixed meta and para cresol-acetaldehyde resin, which is the preferred resin of the present invention, when likewise dissolved in similar solvents or mixtures thereof and baked, also yields infusible coatings. Furthermore, since the cresol resin is soluble in drying oils, any brittleness in the lacquer film may be tempered by adding 5% to 6% of linseed oil or much larger proportions.

To recapitulate, the resins of this invention have the property of heat-bleaching from a substantially dark-colored resin, a 50% solution of which has a color of about #8 Gardner scale, to a substantially light-colored resin, a 50% solution of which has a color of about #4 Gardner scale and, further, have the property of becoming infusible upon being baked at elevated temperatures, say about 170° C., in thin films. The resins dissolve in drying oils to yield non-skinning, substantially non-discoloring varnishes which are light-colored and dry rapidly to durable glossy coatings. The preferred process comprises heating cresol with oxalic acid above 90° C., passing a mixture comprising gaseous acetaldehyde and hydrocarbon gases through the said oxalic acid-cresol mixture until a substantially dark-colored resin is formed, heating said dark-colored resin above the critical temperature of decoloration, say, 180° C., whereby said resin is heat-bleached to a substantially light-colored resin, i. e., very much lighter in color than WW rosin.

Although the oxalic acid-catalyzed carbolic acid-acetaldehyde resin is insoluble or slightly soluble in drying oils, mixtures of phenol and cresol, or higher homologues of phenol may be used. However, the higher the phenol content in the resin the less soluble it will be in fatty oils. It is therefore preferable to use phenol mixtures low in carbolic acid content or substantially free from the same in order to secure ready oil-solubility. The carbolic acid-acetaldehyde resin catalyzed with oxalic acid, however, may be used in solution as a lacquer or binding material or for any other use except in drying oil varnishes.

I have found that oxalic acid-catalyzed phenolic-acetaldehyde resins are compatible with nitrocellulose in solution and in a solvent-free film. The resin may first be heated with a fatty oil such as castor oil or cottonseed oil and the fatty oil-resin mixture used with nitrocellulose as a lacquer. The absence of color in the resins renders them especially useful in lacquers, since water-white films result allowing the clear lacquer to be used or, if desired, delicately colored dyes and pigments may be added.

As I have pointed out above, the resins of the present invention are practically colorless when heat-bleached and what color they do possess arises from the color of the original phenol and, also, to a slightly less degree, from some air-oxidation which the resins necessarily undergo during preparation. It has been stated that the dark color of phenol-acetaldehyde resins is due to a dark-colored by-product which is always formed during the condensation. This by-product has a softening point of 65° C. or below and owing to its formation, about 10% of the phenol remains uncondensed. The resins of the present invention, therefore, may be said to be entirely free from the soft, dark-colored by-product which allows them to be baked to infusible films. If the soft by-product were present it would exert a softening or plasticizing action and the resin would remain fusible and soft indefinitely. This freedom from the soft by-product also differentiates the resins of the present invention from other resins made by processes which admit reaction temperatures above 90° or 100° C. and which use substantially pure acetaldehyde. By using the higher temperatures, I secure more rapid reaction, a more complete condensation and yet obtain resins which are colorless and almost water-white, due to the absence of soft, dark-colored by-products.

What I claim is:

1. A process of making light-colored phenolic-acetaldehyde resin comprising heating a phenolic body selected from the group consisting of phenol, cresols and xylenols with oxalic acid above 90° C., passing a gaseous mixture comprising gaseous acetaldehyde and hydrocarbon gases through said hot oxalic acid-cresol mixture until a substantially dark-colored resin is formed, washing the formed resin with water sufficiently to remove excess of oxalic acid, heating said dark-colored resin above 180° C., whereby said resin is heat-bleached to leave a resin that is not substantially darker in color than WW rosin, having the property of dissolving in drying oils to form substantially non-discoloring, non-skinning varnishes and becoming infusible upon baking at about 170° C., in a thin film.

2. A process of producing light-colored phenolic acetaldehyde resin comprising heating a phenolic body selected from the group consisting of phenol, cresols and xylenols, with oxalic acid in an amount such that the oxalic acid is from 5% to 50% of the phenolic body by weight, passing a gaseous mixture containing acetaldehyde through said mixture of oxalic acid and phenolic body until a substantially dark-colored resin is formed, washing the formed resin with water sufficiently to remove excess of oxalic acid, and thereafter heating said dark-colored washed resin to above 180° C., whereby said resin is heat-bleached to a substantially light-colored resin having the property of dissolving in drying oils to form varnish compositions.

3. A process of making light-colored phenolic-acetaldehyde resin comprising heating a phenol selected from the group consisting of phenol, cresols and xylenols, with about 5% to 50% oxalic acid based on the weight of the phenolic body, to about 80°–90° C., adding acetaldehyde to said oxalic-acid-phenolic mixture until a substantially dark-colored resin is formed, well washing such dark colored resin with water sufficiently to remove excess of oxalic acid, heating said dark-colored resin to above 180° C., whereby said resin is heat-bleached to a substantially light-colored resin.

4. The method of preparing an oil-soluble and light-colored phenolic acetaldehyde resin from materials normally producing a dark-colored resin which comprises preparing a dark-colored resin by reacting a straw colored homologue of phenol with acetaldehyde in the presence of oxalic acid, washing the dark-colored resin sufficiently to remove excess of oxalic acid, and thereafter heat-bleaching and hardening the resin by heating the same to above 180° C.

5. An oxalic-acid-catalyzed-c r e s o l-acetaldehyde resin heat-bleached from a substantially dark-colored resin to a substantially light-colored resin by heating said dark colored resin, substantially alone and after removal of the excess of oxalic acid, such heating being to above 180° C. and a thin film of which becomes infusible upon being baked at about 170° C.

6. A resin which is not darker in color than WW rosin, prepared by condensing a mixture of a phenolic body selected from the group consisting of phenol, cresols and xylenols with acetaldehyde in the presence of not substantially less than 5% of oxalic acid based on said phenolic body, and after resinification subjecting the mass to a sufficient washing with water to remove excess of oxalic acid, and thereafter to a heat-treatment at a temperature above 180° C.

7. An oxalic acid-catalyzed cresylic-acid-acetaldehyde resin, which is water-washed sufficiently to remove excess oxalic acid and thereafter heat-bleached, from a substantially dark-colored initial resin to a substantially light-colored final resin, by being heated to above 180° C.

8. An oxalic-acid-catalyzed phenolic-acetaldehyde resin, the phenolic component of which is selected from the group consisting of phenol, cresols and xylenols, said resin being not substantially darker than WW rosin, having been formed in the presence of oxalic acid in amount not substantially below 5%, figured on the weight of the phenolic body, then washed with water sufficiently to remove excess of oxalic acid, and thereafter converted from a substantially dark-colored resin, a 50% solution of which has a color of about No. 8 Gardner scale, to a substantially light-colored resin, a 50% solution of which has a color of about No. 4 Gardner scale, by heating to above 180° C.

9. A substantially non-discoloring, non-skinning composition comprising a mixture of a drying oil and the resin of claim 5.

10. A substantially non-discoloring, non-skinning composition of varnish-like consistency comprising a liquid mixture of a drying oil and the oxalic-acid-catalyzed phenolic-acetaldehyde resin as claimed in claim 6.

11. A substantially non-discoloring, non-skinning composition comprising a mixture of a drying oil and the oxalic-acid-catalyzed cresylic-acid-acetaldehyde resin, as covered in claim 7.

12. A substantially non-discoloring, non-skinning composition comprising a mixture of a drying oil and a resin as claimed in claim 8.

JOHN B. RUST.